United States Patent
Morelli et al.

(10) Patent No.: US 9,410,475 B2
(45) Date of Patent: Aug. 9, 2016

(54) SYSTEM AND METHOD FOR DETERMINING TURBINE DEGRADATION AND MITIGATING TURBINE DEGRADATION IN A VARIABLE GEOMETRY TURBOCHARGER

(71) Applicant: Ford Global Technologies, LLC, Dearborn, MI (US)

(72) Inventors: Anthony Morelli, Troy, MI (US); Brien Lloyd Fulton, West Bloomfield, MI (US); Thomas Kostrzewski, Brownstown, MI (US); Jason Ronald Smith, Canton, MI (US); Kyle Pohlkamp, Superior Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 270 days.

(21) Appl. No.: 14/300,147

(22) Filed: Jun. 9, 2014

(65) Prior Publication Data

US 2015/0354442 A1 Dec. 10, 2015

(51) Int. Cl.
| | |
|---|---|
| *F02B 37/22* | (2006.01) |
| *F02M 25/07* | (2006.01) |
| *F02B 37/24* | (2006.01) |
| *F02B 39/16* | (2006.01) |
| *F02D 41/14* | (2006.01) |
| *F02D 41/22* | (2006.01) |

(52) U.S. Cl.
CPC ................ *F02B 37/22* (2013.01); *F02B 37/24* (2013.01); *F02B 39/16* (2013.01); *F02D 41/145* (2013.01); *F02D 41/1448* (2013.01); *F02D 41/22* (2013.01); *F02M 25/0702* (2013.01); *F02M 25/0706* (2013.01); *F02M 25/077* (2013.01); *F02M 25/0753* (2013.01); *F02D 2041/1433* (2013.01); *F02D 2250/34* (2013.01)

(58) Field of Classification Search
CPC ......... F02B 39/16; F02B 37/22; F02M 26/07; F02M 26/10; F02M 26/49; F02M 26/04; F02M 26/45; F02M 26/52; F02D 41/00; F02D 41/0052; F02D 41/22; F02D 2041/1433
See application file for complete search history.

(56) References Cited

U.S. PATENT DOCUMENTS

| | | | |
|---|---|---|---|
| 7,593,828 B2 | 9/2009 | Wang et al. | |
| 8,109,091 B2 | 2/2012 | Xiao et al. | |
| 8,346,462 B2 * | 1/2013 | Nakamura | F02M 26/48 123/568.16 |

(Continued)

FOREIGN PATENT DOCUMENTS

EP 2309111 B1 4/2013

OTHER PUBLICATIONS

Kostrzewski, Thomas, "System and Method for Reducing Vane Sticking in a Variable Geometry Turbocharger," U.S. Appl. No. 14/249,122, filed Apr. 9, 2014, 31 pages.

*Primary Examiner* — Hieu T Vo
(74) *Attorney, Agent, or Firm* — Julia Voutyras; Alleman Hall McCoy Russell & Tuttle LLP

(57) ABSTRACT

A method for operating a vehicle system is described herein. The method includes indicating a variable geometry turbine degradation based on a comparison of a modeled set of turbine pressure values and a sensed set of turbine pressure values, each set of turbine pressure values including a pressure value upstream of the turbine and a pressure value downstream of the turbine and the variable geometry turbine positioned downstream of an engine cylinder.

20 Claims, 7 Drawing Sheets

(56) References Cited

U.S. PATENT DOCUMENTS

| | | | | |
|---|---|---|---|---|
| 2011/0023486 A1* | 2/2011 | Kazadi | ............ | F01K 27/00 60/651 |
| 2012/0023932 A1 | 2/2012 | Ge et al. | | |
| 2016/0069301 A1* | 3/2016 | Karunaratne | ......... | F02M 26/49 123/568.12 |

* cited by examiner

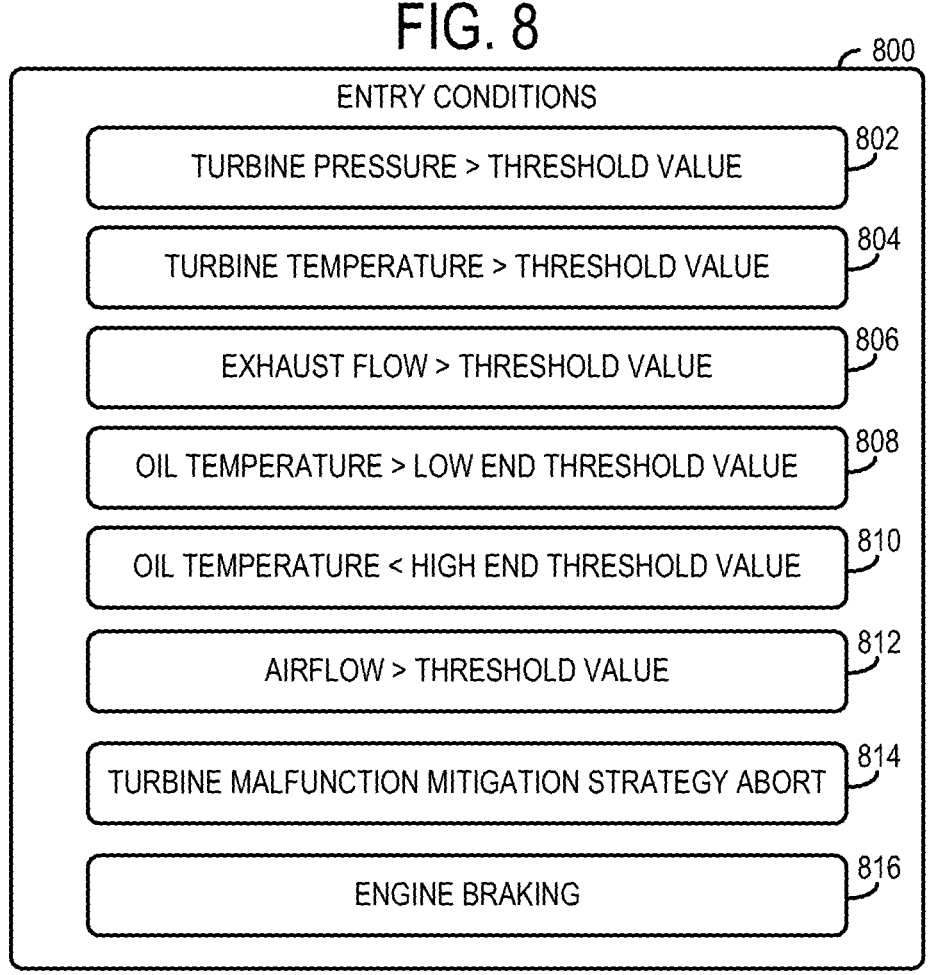

SYSTEM AND METHOD FOR DETERMINING TURBINE DEGRADATION AND MITIGATING TURBINE DEGRADATION IN A VARIABLE GEOMETRY TURBOCHARGER

FIELD

The present disclosure relates to a system and method for determining turbine degradation and mitigating turbine degradation in a variable geometry turbocharger.

BACKGROUND AND SUMMARY

Boosted engines may provide a number of benefits, such as decreased emissions and increased fuel efficiency, when compared to naturally aspirated engines having a similar power output. Furthermore, boosted engines may be lighter than naturally aspirated engines having a similar power output. As a result, vehicle efficiency is increased when engines are boosted by devices, such as turbochargers. Therefore, boosting devices have many benefits and therefore are incorporated into some engine designs to improve performance and fuel economy.

However, turbochargers may experience lag during certain operating conditions, such as tip-in, start-up, etc. The lag decreases the power output of the engine and delays throttle response, impacting vehicle performance and decreasing customer satisfaction. Furthermore, fixed vane turbochargers may only be sized to efficiently operate over limited engine speed and load ranges, thereby decreasing engine operating efficiency in certain areas to provide benefit in other areas. Specifically, some turbochargers may have a threshold speed below which a compressor provides negligible boost to the engine and also a choke flow area where additional flow cannot be achieved through the turbocharger regardless of the work extracted from the turbine. Therefore, when the engine is operated below the threshold speed or above the choke flow region, engine performance may suffer.

U.S. Pat. No. 8,109,091 discloses a variable geometry turbocharger configured to alter the aspect ratio of the turbine based on engine conditions. U.S. Pat. No. 8,109,091 also discloses a control system which uses various modules to determine if the vanes in the turbine are stuck or jammed. The modules take into account only engine speed, engine load, and engine temperature to determine if the vanes are stuck or jammed. However, the Inventors have recognized several drawbacks with the VGT system and control method disclosed in U.S. Pat. No. 8,109,091. For instance, using only engine speed, engine load, and engine temperature to determine vane sticking may not be a sufficiently accurate determination during certain engine operating conditions, permitting vane sticking to go undiagnosed. The control method disclosed in U.S. Pat. No. 8,109,091 only determines the engine is operating in an undesirable range of engine speed, load, and temperature regardless of turbine operation. As a result, the turbine vane mechanism may experience excessive friction, thereby causing corrosion and wear in the turbine that can make it more susceptible to sticking due to other forces acting on the vane mechanism and/or other components. It will be appreciated that using only engine speed, engine load, and engine temperature cannot take into account those noise factors and make an accurate determination on vane sticking Specifically, excessive aerodynamic loads may be exerted on the turbine during certain operating conditions that can cause the turbine response to slow down and become stuck and the problem is not accounted for. Moreover, using only engine speed, engine load, and engine temperature to determine turbine vane degradation may lead to false determinations degradation (e.g., malfunction). As a result, unnecessary actions may be taken to resolve this false positive which may impact vehicle performance, increase emissions, etc.

The Inventors herein have recognized the above issues and developed a method for operating an engine system. The method includes indicating a variable geometry turbine degradation based on a comparison of a modeled set of turbine pressure values and a sensed set of turbine pressure values, each set of turbine pressure values including a pressure value upstream of the turbine and a pressure value downstream of the turbine and the variable geometry turbine positioned downstream of an engine cylinder. In this way, a comparison of modeled pressures across the turbine and sensed pressures across the turbine may be used to determine turbine degradation, thereby increasing the accuracy and speed of this determination. Quick determination of a degradation condition can improve the ability of the mitigation actions to be successful by catching the degradation condition before the aerodynamic forces get even larger, making it harder to correct. Consequently, turbine degradation may be diagnosed over a wider range of engine operating conditions.

Further in some examples the method may additionally include, in response to determining the variable geometry turbine degradation, selecting a turbine degradation mitigation action from a group of turbine degradation mitigation actions based on the comparison of the modeled set of turbine pressure values and the sensed set of turbine pressure values. This selection can be tailored to provide a desired response to alleviate the condition without excessive action that can negatively impact vehicle operation. An example would be if the engine is running at very high speed and load and it is desirable for the condition to be alleviated quickly, an effective turbine mitigation may be activation of a turbine bypass valve to avoid further damage to the engine by over-pressurization. Further in one instance, if an engine were running at lower load with lower pressures, the response could be using a mitigation action that has lesser impact on vehicle operation to alleviate the turbine degradation, but decreases (e.g., limits) adverse effects of the mitigation action.

In this way, an action which mitigates (e.g., substantially eliminates) turbine degradation (e.g., malfunction) during the current operating conditions may be selected to improve turbine operation after turbine degradation is diagnosed. Consequently, turbine operation may be improved and the likelihood of the turbine experiencing excessive pressure conditions is significantly reduced, thereby increasing turbine longevity.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure. Additionally, the above issues have been recognized by the inventors herein, and are not admitted to be known.

BRIEF DESCRIPTION OF THE DRAWINGS

FIG. 8 shows a table of entry conditions.

DETAILED DESCRIPTION

A system and method for determining and mitigating turbine degradation in a variable geometry turbocharger is described herein. Specifically, the system and method may be used to accurately determine turbine degradation based on a comparison of modeled and sensed pressure values both upstream and downstream of the turbine. In this way, a comparison of modeled pressures across the turbine and sensed pressures across the turbine may be used to increase the accuracy of a turbine degradation determination. Consequently, turbine degradation (e.g., malfunction) may be diagnosed over a wider range of engine operating conditions and more quickly, thereby improving turbine degradation diagnostics techniques in the vehicle system. Further in some examples, the method may additionally include, in response to determining the variable geometry turbine degradation, selecting one or more turbine degradation mitigation actions from a group of turbine degradation mitigation actions based on the comparison of the modeled set of turbine pressure values and the sensed set of turbine pressure values. In this way, one or more actions which alone or synergistically mitigate (e.g., substantially eliminate) turbine degradation may be selected to improve turbine operation after the turbine degradation is robustly diagnosed. Consequently, turbine operation may be improved and the likelihood of the turbine experiencing excessive pressure conditions is significantly reduced, thereby increasing turbine longevity. Further it will be appreciated that the actions may be selected which are suited for the current engine operating condition, to decrease the likelihood of overpressure conditions in the turbine.

Figure 1:
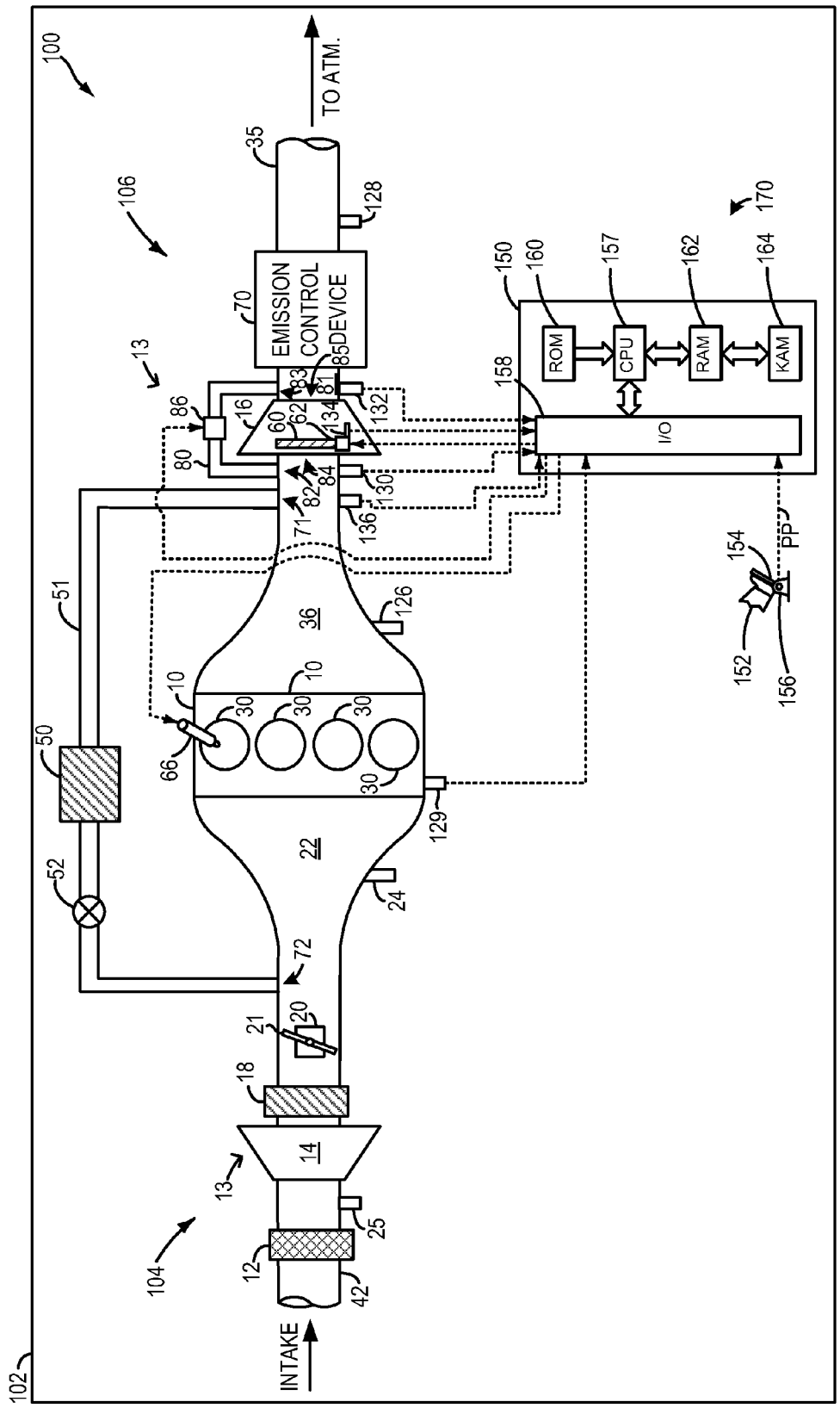
FIG. 1 shows a schematic depiction of a vehicle having an engine and a variable geometry turbocharger.

FIG. 1 schematically shows aspects of an example engine system 100 including an engine 10. The engine system 100 may be included in a vehicle 102. The engine system 100 may include engine 10 and additional components which are depicted in FIG. 1 and described in greater detail herein. In the depicted example, engine 10 is a boosted engine coupled to a turbocharger 13 including a compressor 14 driven by a turbine 16. The compressor 14 may be mechanically coupled to the turbine 16 via a suitable mechanical component such as a drive shaft. The compressor 14 is configured to increase the pressure of the intake air to provide boost to engine 10. On the other hand, the turbine 16 is configured to receive exhaust gas from the engine and drive the compressor 14. The turbine 16 includes a plurality of vanes 60. The vanes 60 are moveable to alter the aspect ratio of the turbine 16. Thus, the turbine may be referred to as a variable geometry turbine (VGT). Thus, the vanes 60 are moveable to increase or decrease the aspect ratio of the turbine. As a result, the turbocharger may be adjusted based on engine operating conditions (e.g., speed, load, engine temperature, etc.,) to decrease engine feed gas emissions and/or increase engine power output, thereby increasing engine efficiency, if desired. An actuation device 62 is coupled to the plurality of vanes 60. The actuation device 62 is configured to alter the positions of the plurality of vanes 60.

The actuation device may be a hydraulic actuator controlled via engine oil pressure solenoid valve, in one example. In another example, the actuation device 62 may be an electronic actuation device. In such an example, the actuation device 62 may be in electronic communication with the controller 150.

Fresh air is introduced along intake passage 42 into engine 10 via filter 12 and flows to compressor 14. The filter 12 may be configured to remove particulates from the intake air. A flow rate of ambient air that enters the intake sub-system through intake passage 42 can be controlled at least in part by adjusting throttle 20. The throttle 20 includes a throttle plate 21. The throttle plate 21 is adjustable to regulate the amount of airflow provided to downstream components (e.g., the cylinders 30). The throttle 20 may be in electronic communication with the controller 150. However in other examples, such as in the case of a compression ignition engine, the throttle may not be included in the engine.

Compressor 14 may be any suitable intake-air compressor. In engine system 10, the compressor is a turbocharger compressor mechanically coupled to turbine 16 via a shaft (not shown), the turbine 16 driven by expanding engine exhaust. In one example, the turbocharger may be a variable geometry turbocharger (VGT), where turbine geometry may be actively varied as a function of engine speed and/or load. As shown, the turbine 16 includes moveable vanes 60 which are adjustable via an actuation device 62, discussed in greater detail herein.

The vehicle 102 includes an intake sub-system 104 including the intake passage 42, the filter 12, the compressor 14, the charge-air cooler 18, the throttle 20, and the intake manifold 22. The intake sub-system 104 may further include intake valves (e.g., poppet valves) coupled to the cylinders 30. The intake sub-system 104 is in fluidic communication with the engine 10. Specifically, the intake sub-system 104 is configured to provide intake air to the cylinders 30.

The vehicle 102 further includes an exhaust sub-system 106. The exhaust sub-system 106 may include the exhaust manifold 36, turbine 16, emission control device 70, and exhaust conduit 35. The exhaust sub-system 106 further includes a turbine bypass conduit 80 and a turbine bypass valve 86, discussed in greater detail herein. It will be appreciated that the exhaust system may include additional components such as exhaust valves, conduits, mufflers, etc.

As shown in FIG. 1, compressor 14 is coupled, through charge-air cooler 18 to throttle 20. Throttle 20 is coupled to engine intake manifold 22. From the compressor, the compressed air charge flows through the charge-air cooler and the throttle valve to the intake manifold. The charge-air cooler may be an air-to-air or air-to-water heat exchanger, for example. In the example shown in FIG. 1, the pressure of the air charge within the intake manifold is sensed by manifold air pressure (MAP) sensor 24. A compressor bypass valve (not shown) may be included in the intake system, in other examples. In such an example, the compressor bypass valve may be a normally closed valve configured to open under selected operating conditions to relieve excess boost pressure. For example, the compressor bypass valve may be opened during conditions of decreasing engine speed to avert compressor surge. However, in other examples the compressor bypass valve may be omitted from the engine system, if desired.

Intake manifold 22 is coupled to a series of cylinders 30 through a series of intake valves (not shown). The cylinders are further coupled to exhaust manifold 36 via a series of exhaust valves (not shown). In the depicted example, a single exhaust manifold 36 is shown. However, in other examples, the exhaust manifold may include a plurality of exhaust manifold sections. Configurations having a plurality of exhaust manifold section may enable effluent from different cylinders to be directed to different locations in the engine system.

Cylinders 30 may be supplied one or more fuels, such as gasoline, alcohol fuel blends, diesel, biodiesel, compressed natural gas, etc. Therefore it will be appreciated that the engine may utilize any of the aforementioned fuels. Fuel may be supplied to the cylinders via fuel injector 66. In the depicted example, fuel injector 66 is configured for direct injection though in other examples, fuel injector 66 may be configured for port injection or throttle valve-body injection. Further, each cylinder may include one or more fuel injectors of different configurations to enable each cylinder to receive fuel via direct injection, port injection, throttle valve-body injection, or combinations thereof. In the cylinders, combustion may be initiated via spark ignition and/or compression ignition. The fuel injector may be in fluidic communication with a fuel tank (not shown) configured to store a fuel. The fuel injector and fuel tank may be included in a fuel delivery system which may additionally include one or more pumps, filter, valves, etc. In the case of a spark ignition engine ignition devices may be coupled to the cylinders.

Exhaust from exhaust manifold 36 is directed to turbine 16 to drive the turbine. The flow from the turbine then flows through emission control device 70. In general, one or more emission control devices 70 may include one or more exhaust after-treatment catalysts configured to catalytically treat the exhaust flow, and thereby reduce an amount of one or more substances in the exhaust flow. For example, one exhaust after-treatment catalyst may be configured to trap $NO_x$ from the exhaust flow when the exhaust flow is lean, and to reduce the trapped $NO_x$ when the exhaust flow is rich. In other examples, an exhaust after-treatment catalyst may be configured to disproportionate $NO_x$ or to selectively reduce $NO_x$ with the aid of a reducing agent. In still other examples, an exhaust after-treatment catalyst may be configured to oxidize residual hydrocarbons and/or carbon monoxide in the exhaust flow. Different exhaust after-treatment catalysts having any such functionality may be arranged in wash coats or elsewhere in the exhaust after-treatment stages, either separately or together. In some examples, the exhaust after-treatment stages may include a regenerable soot filter configured to trap and oxidize soot particles in the exhaust flow. All or part of the treated exhaust from emission control device 70 may be released into the atmosphere via exhaust conduit 35.

Depending on operating conditions, a portion of exhaust may be recirculated from the exhaust manifold 36, upstream of turbine 16, to intake manifold 22, downstream of compressor 14 via EGR passage 51, through EGR cooler 50 and EGR valve 52. In this manner, high pressure exhaust gas recirculation (HP-EGR) may be enabled. It will be appreciated that the EGR cooler 50 may be omitted from the engine system 100, in other examples. The EGR passage 51 includes an inlet 71 positioned downstream of the cylinders 30 and upstream of the turbine 16. Specifically, the inlet 71 opens into the exhaust manifold 36. However, other suitable inlet locations have been contemplated. For instance, the inlet 71 may open into an exhaust conduit upstream of the turbine 16. The EGR passage 51 further includes an outlet 72 positioned downstream of the throttle 20 and compressor 14. Specifically, in the depicted example the outlet 72 opens into the intake manifold 22. However, other outlet positions have been contemplated. For instance, the outlet 72 may open into an intake conduit downstream of the compressor 14 and/or throttle 20.

In some examples, in addition to the HP-EGR, low pressure exhaust gas recirculation (LP-EGR) may also be enabled wherein a portion of treated exhaust is recirculated from the exhaust conduit 35, downstream of turbine 16, to intake passage 42 upstream of compressor 14 via a low pressure EGR passage and therein coupled EGR cooler and EGR valve (not shown). EGR valve 52 may be opened to admit a controlled amount of cooled exhaust gas to an intake passage upstream of the compressor. The relatively long EGR flow path in engine system 100 provides homogenization of the exhaust gas into the intake air charge. Further, the disposition of EGR take-off and mixing points provides effective cooling of the exhaust gas for increased available EGR mass and improved performance.

A turbine bypass conduit 80 opens into an exhaust passage upstream of the turbine, the exhaust manifold 36 in the depicted example, and an exhaust passage 81 downstream of the turbine 16. Specifically in one example, the conduit inlet 82 and outlet 83 may be positioned directly upstream and downstream of a turbine inlet 84 and a turbine outlet 85, respectively. A turbine bypass valve 86 is coupled to the turbine bypass conduit 80 and configured to adjust the exhaust gas flow therethrough. Thus, the turbine bypass valve 86 is configured to increase (e.g., permit) and decrease (e.g., inhibit) exhaust gas flowed around (i.e., bypassing) the turbine 16. As shown, a controller 150 is in electronic communication with the turbine bypass valve 86 and therefore configured to send control signals thereto. The controller 150 is discussed in greater detail herein. Thus, the exhaust gas flow through the turbine bypass conduit 80 may be regulated based on engine operating conditions. It will be appreciated that operation of the turbine bypass valve 86 and EGR valve 52 may be used in conjunction to mitigate turbine degradation (e.g., vane lag, vane sticking, etc.).

During engine operation, a cylinder piston gradually moves downward from TDC, bottoming out at BDC by the end of the power stroke. The piston then returns to the top, at TDC, by the end of the exhaust stroke. The piston then again moves back down, towards BDC, during the intake stroke, returning to its original top position at TDC by the end of the compression stroke. During cylinder combustion, an exhaust valve may be opened just as the piston bottoms out at the end of the power stroke. The exhaust valve may then close as the piston completes the exhaust stroke, remaining open at least until a subsequent intake stroke has commenced. In the same way, an intake valve may be opened at or before the start of an intake stroke, and may remain open at least until a subsequent compression stroke has commenced. It will be appreciated that the above combustion cycles is exemplary and other types of combustion cycles in the engine have been contemplated.

A controller 150 may be included in the vehicle 102. The controller 150 may be configured to receive signals from sensors in the vehicle as well as send command signals to components. Various components in the vehicle 102, engine system 100, and the engine 10 may be controlled at least partially by a control system (e.g., electronic control subsystem) including the controller 150 and by input from a vehicle operator 152 via an input device 154. In this example, input device 154 includes an accelerator pedal and a pedal position sensor 156 for generating a proportional pedal position signal PP. The controller 150 is shown in FIG. 1 as a microcomputer, including processor 157 (e.g., microprocessor unit), input/output ports 158, an electronic storage medium for executable programs and calibration values shown as read only memory 160 (e.g., read only memory chip) in this particular example, random access memory 162, keep alive memory 164, and a data bus. Storage medium read-only memory 160 can be programmed with computer readable data representing instructions executable by processor 157 for performing the methods described below as well as other variants that are anticipated but not specifically listed. The controller 150 is configured to send a signal to the throttle 20. The controller 150 is also configured to send a signal to the turbine vane actuator 62, the fuel injector 66, the turbine bypass valve 86, and the EGR valve 52. Thus, the controller may send a signal to the EGR valve to adjust (e.g., increased or decrease) the amount of EGR gas flowing through the EGR passage 51. The controller is configured to send a signal to the turbine bypass valve to adjust the amount of exhaust gas flowing therethrough. Additionally, the controller is configured to send a signal to the fuel injectors 66 to adjust an amount of fuel injected into the cylinders 30. In this way, an amount of metered fuel may be provided to the cylinders 30. The controller may also send signal to the throttle 20 to adjust the flowrate of air in the intake system. The controller 150 may also receive signals from the MAP sensor 24, a mass airflow sensor (MAF) 25 positioned upstream of the compressor 14, a pressure sensor 126 positioned in the exhaust manifold, an exhaust gas composition sensor 128 positioned downstream of the emission control device, and/or a temperature sensor 129 coupled to the engine. The controller 150 may further receive signals from a pressure sensor 130 position upstream (e.g., directly upstream) of the turbine inlet 84, a pressure sensor 132 positioned downstream (e.g., directly downstream) of the turbine outlet 85, and a vane position sensor 134 coupled to the actuation device 62. It will be appreciated that in other examples the vane position sensor may be omitted from the vehicle. Additionally in other examples the pressure sensor 132 may be omitted from the vehicle and the downstream pressure may be determined via modelling. A temperature sensor 136 may be coupled to the exhaust manifold 36. Alternatively, temperature sensor 136 may be coupled to the turbine 16. It will be appreciated that the term directly means that there are not intervening components between the components in question. Furthermore, the terms upstream and downstream refer to a general direction of flow of exhaust gas through the exhaust subsystem when the engine is performing combustion.

FIG. 1 also shows electronic control sub-system 170, which may be any electronic control sub-system of the engine system 100. The engine system 100 may include the variable geometry turbocharger 13 as well as other components, in some examples. The electronic control sub-system may be configured to command the opening and closing of the vanes 60 in the turbine 16, command opening and closing of the EGR valve 52, command adjustment of fuel injector 66, command adjustment (e.g., opening and closing) of turbine bypass valve 86, and command adjustment of the throttle 20. In some examples, the commands may be generated and/or sent via the controller 150. The electronic control sub-system may also be configured to command the opening, closure, and/or adjustment of various electronically actuated valves in the engine system such as fuel delivery system valves, for example as needed to enact any of the control functions described herein. Further, to assess operating conditions in connection with the control functions of the engine system, the electronic control sub-system may be operatively coupled to a plurality of sensors arranged throughout the engine system flow sensors, temperature sensors, pedal-position sensors, pressure sensors, etc.

The electronic control sub-system 170 may be configured to move the plurality of vanes 60 in the turbine 16 into a closed (e.g. fully or partially closed) position in response to tip-out. It will be appreciated that tip-out may be initiated when a driver requested torque is discontinued. Thus, engine braking may be implemented via the turbine during certain operating conditions. It will be appreciated that engine braking may also be implemented in response to a driver brake request. The driver brake request may be generated in response to driver interaction with a brake pedal and/or driver selectable switch, for example. Subsequently, tip-in may be implemented in response to a driver torque request, in one example. Tip-in may be referred to as a tip-in event. The control system 170 may be further configured to, in response to throttle tip-in, determine a sensed turbine inlet pressure and a sensed turbine outlet pressure based on signals received from sensors adjacent to the turbine inlet and the turbine outlet. The electronic control sub-system 170 may also be configured to determine a modeled turbine inlet pressure and a modeled turbine outlet pressure based on a turbine inlet pressure model and turbine outlet pressure model and determine a variable geometry turbine degradation based on a comparison of the modeled and sensed turbine inlet pressures and turbine outlet pressures. Specifically, a difference between a modeled change in pressure across the turbine and a sensed changed in pressure may be used to determine turbine degradation. Still further in another example, a difference between a ratio of a modeled upstream pressure and a downstream pressure and a ratio of a sensed upstream pressure and downstream pressure may be used to determine degradation. It will be appreciated that the models may include algorithms using various parameters to determine pressure values based on physical, regressive, or observer types of models based on different methods including orifice flow, turbine and compressor—turbine work comparisons that determine turbine delta pressure using that comparison.

The electronic control sub-system 170 may further be configured to, in response to determining the variable geometry turbine degradation, select a turbine degradation mitigation action from a group of turbine degradation mitigation actions based on the comparison of the modeled and sensed turbine inlet pressures and turbine outlet pressures. The turbine degradation mitigation actions are configured to increase the likelihood of vanes in the turbine from becoming unstuck or un jammed to improve turbine operation and decrease the likelihood of turbine damage caused by overpressure conditions. The group of turbine degradation mitigation actions is discussed in greater detail herein with regard to FIG. 6.

In one example, tip-out may be throttle tip-out where a driver has discontinued a torque request and the throttle is moved into a closed (e.g., fully closed or partially closed) position from an open position. It will be appreciated that throttle tip-out may be implemented in a spark ignition engine. Additionally or alternatively, tip-out may include discontinuing fuel injection in the engine, in one example. In the case of a compression ignition engine, tip-out may include discontinuing fuel injection and may not include throttle adjustment. Further in one example, tip-in may be a throttle tip-in where the throttle is opened from a closed positioned and adjusted to maintain stoichiometry. Additionally or alternatively, tip-in may include restarting fuel injection in the engine. In the case of a compression ignition engine, tip-in may include restarting fuel injection and may not include throttle adjustment.

As described above, FIG. 1 shows a non-limiting example of an internal combustion engine. It should be understood that in some examples, the engine may have more or less combustion cylinders, control valves, throttles, and compression devices, among others. Example engines may have cylinders arranged in a "V" configuration, a horizontally opposed configuration, etc.

Figure 2:
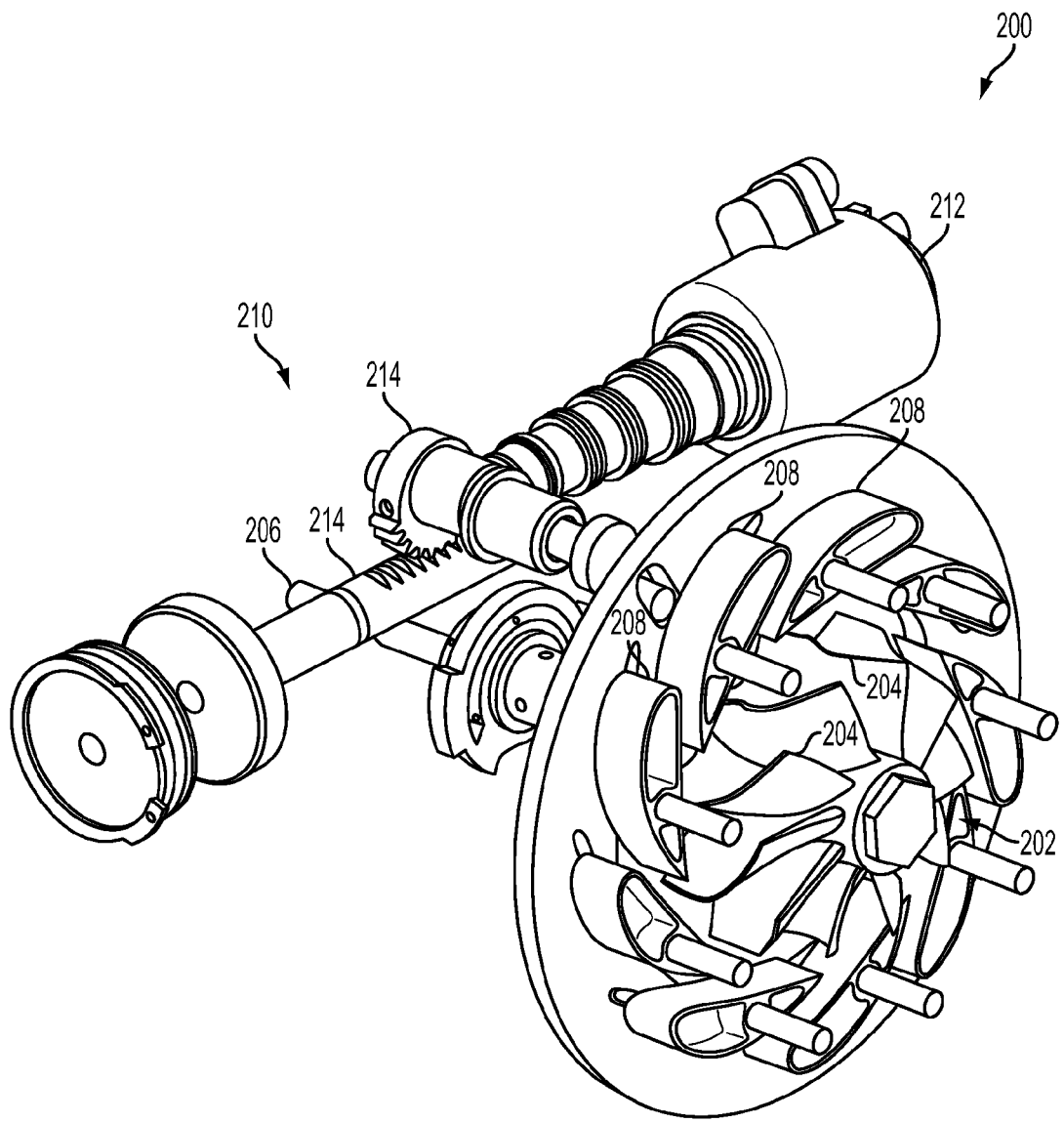
FIG. 2 shows an illustration of an example variable geometry turbine which may be included in the vehicle shown in FIG. 1.

FIG. 2 shows an example turbine 200. It will be appreciated that the turbine 200 may be the turbine 16 shown in FIG. 1, in one example. Therefore, the turbine 200 may be included in the engine system 100, shown in FIG. 1, and specifically the turbocharger 13, shown in FIG. 1.

Continuing with FIG. 2, the turbine 200 includes a rotor 202 configured to extract energy from the exhaust gas and convert it into rotational motion. As shown, the rotor 202 includes a plurality of blades 204. A shaft 206 coupled to the rotor 202 is also included in the turbine 200. It will be appreciated that the shaft 206 may be coupled to a compressor, such as the compressor 14, shown in FIG. 1. Thus, the rotational motion from the rotor may be transferred to the compressor.

As shown in FIG. 2, the turbine 200 further includes a plurality of vanes 208. Each of the vanes 208 is adjustable to enable the aspect ratio of the turbine 200 to be changed, when desired. Thus, the vanes 208 are moveable and at least partially surround the rotor 202.

The turbine also includes and actuation device 210. It will be appreciated that the actuation device 210 shown in FIG. 2 may be the actuation device 62, shown in FIG. 1, in one example. Thus, the actuation device 210 may be in electronic communication with the controller 150, shown in FIG. 1. Continuing with FIG. 2, the actuation device includes an actuation apparatus 212 which in the depicted example is a hydraulic based device that moves based on a solenoid valve that meters oil into a control volume, actuating a piston that mechanically moves a unison ring attached to a set of movable vanes. These mechanisms can also be electrically or pneumatically actuated, in other examples. The actuation device 210 further includes mechanical actuation elements 214, such as gears, shafts, etc., in the depicted example. It will be appreciated that the actuation device 210 is configured to adjust the position of the vanes 208. It will also be appreciated that a turbine housing (not shown) has been omitted from FIG. 2. However, a turbine housing at least partially surrounding the rotor 202 and vanes 208 may be included in the turbine 200, in other examples.

Figure 3:
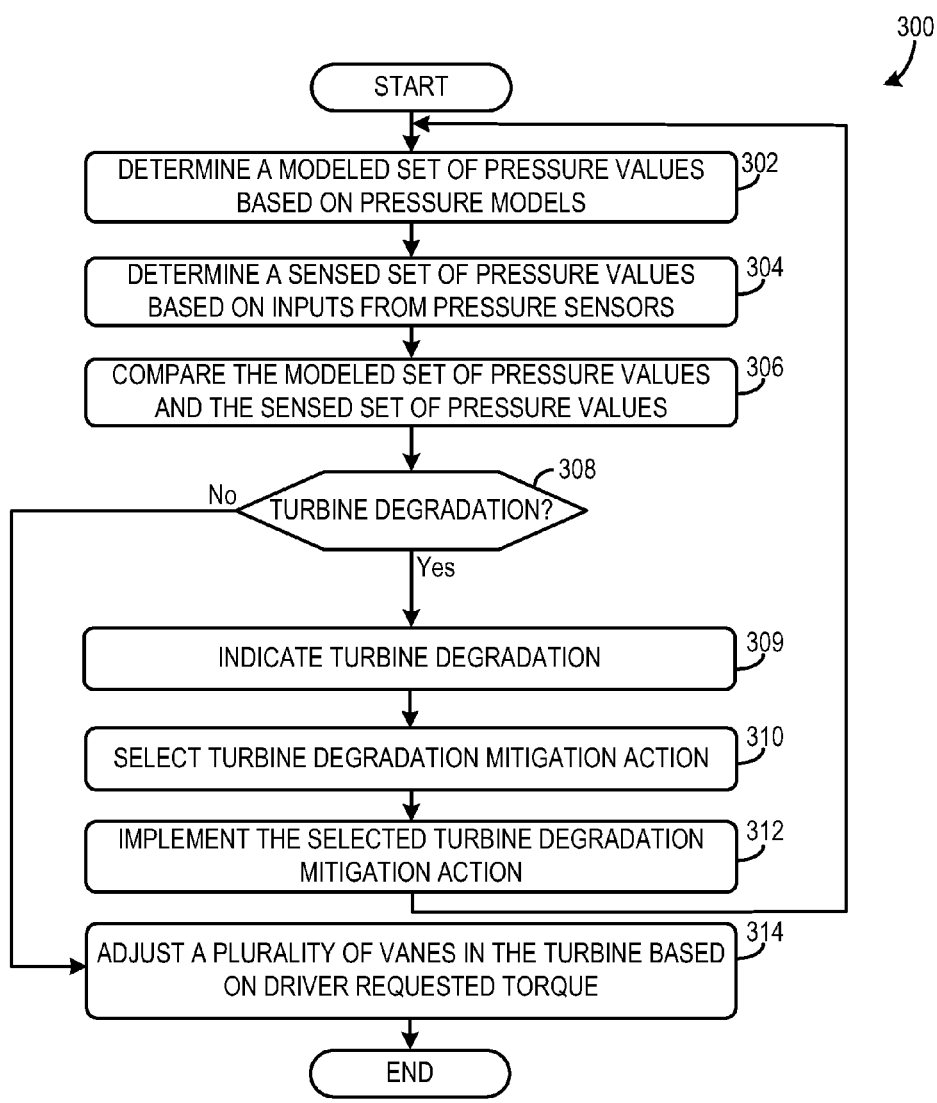
FIGS. 3-5 show various methods for operation of an engine system.

FIG. 3 shows a method 300 for operation of an engine system. The method 300 may be implemented via engine system 100, electronic control sub-system 170, etc., described above with regard to FIG. 1. However in other examples, other suitable engine systems, electronic control sub-system, etc., may be used to implement method 300.

At 302 the method includes determining a modeled set of pressure values based on pressure models. The modeled set of pressure values may include a pressure value upstream of the turbine (e.g., at the turbine inlet) and a pressure value downstream of the turbine (e.g., at the turbine outlet). As previously discussed, the modeled pressures may be determined via an algorithm stored in the control system. The algorithm may accurately determine via the use of input parameters. In one example, the modeled set of turbine pressure values is a function of a modeled turbine vane position, exhaust flow, and exhaust temperature (density correction) of that flow. In one example, step 302 may be implemented only after one or more entry conditions are met. The entry conditions may include an oil temperature, mass air flow in the intake or exhaust system, exhaust temperature, modelled or measured vane position, etc. It will be appreciated that certain areas of turbine operation have higher friction. Additionally, it is also worth noting that the turbine delta pressure thresholds can be decreased when these conditions are corrected to allow faster detection of the degraded operating conditions. Still further in one example, the modeled set of turbine pressure values may be determined based on orifice flow using input parameters for exhaust mas flow, modelled or measured turbine vane position, and exhaust temperature. Exemplary types of models may include a physical model, a regressive model, and/or an observer model.

Next at 304 the method includes determining a sensed set of pressure values based on inputs from pressure sensors. It will be appreciated that the pressure sensors may be positioned upstream (e.g., directly upstream) and downstream (e.g., directly downstream) of a turbine inlet and a turbine outlet. Therefore the sensed set of pressure values may include a pressure value upstream of the turbine (e.g., at the turbine inlet) and a pressure value downstream of the turbine (e.g., at the turbine outlet).

At 306 the method includes comparing the modeled set of pressure values and the sensed set of pressure values and at 308 the method include determining turbine degradation based on the comparison of the modeled set of pressure values and the sensed set of pressure values. It will be appreciated that turbine degradation may include a condition in the turbine where vanes are slow moving, non-responsive, stuck, and/or jammed. As previously discussed, turbine degradation may lead to overpressure conditions in the turbine if left unmitigated. In one example when a difference between a ratio of sensed pressures upstream and downstream of the turbine and a ratio of modeled pressures upstream and downstream of the turbine exceeds a predetermined threshold value turbine degradation may be determined. Further in another example, a difference between a sensed change in pressure across the turbine and a modeled change in pressure across the turbine exceeds a predetermined threshold value turbine degradation may be determined. Further in one example, turbine degradation may also be determined based on turbine vane position and mass airflow in the exhaust sub-system. For instance, when the vanes in the turbine are above a calibrated position, the exhaust mass flowrate is above a calibrated position, and the difference between the modeled and sensed pressures is above a threshold value it may be determined that the turbine is degraded. Therefore, additional parameters may be used to increase the accuracy of the turbine malfunction determination, if desired. In one example, turbine degradation may be determined when the delta pressure is above a threshold and also based on the time interval of the delta pressures. Specifically, degradation may be determined when the time interval over which the delta pressure is measured is greater than a threshold value. It will be appreciated that time may be used as an indicator of malfunction because turbine responses may generate delta pressures greater than the threshold value for a short period of time but when the turbine is experiencing a slow or stuck vane condition the delta pressure persists for a greater period of time.

In another example, and/or in addition to and in combination with the above example, the variable geometry turbine degradation may be determined when a difference between the pressure ratios is outside a range that is greater than an error threshold of the modelled set of pressure values and the sensed set of turbine pressure values as well as an expected pressure range variability mapped for a condition the engine is operating in for a set time that exceeds normal response time ranges of the turbocharger. Still further in another example, the variable geometry turbine degradation is determined when a difference between the sensed change in pressure across the turbine and the modeled change in pressure across the turbine is greater than a pre-defined pressure difference threshold that is greater than an expected model accuracy and pressure variability for the engine population at an operation point. Additionally, the difference must also be set a time greater than normal response times of the turbocharger.

If it is determined that the turbine is not degraded (NO at 308) the method advances to 312. At 312 the method includes adjusting a plurality of vanes in the turbine based on driver-requested torque.

Figure 6:
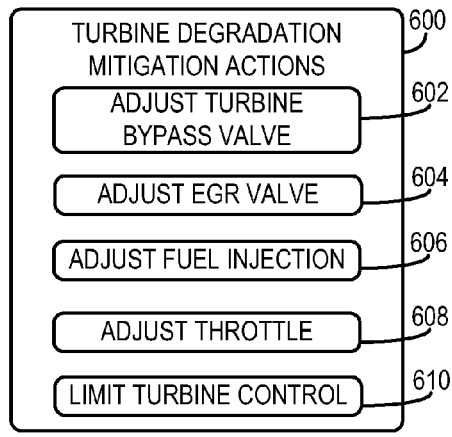
FIG. 6 shows a table of turbine degradation mitigation actions which may be implemented via the engine system shown in FIG. 1 and the methods shown in FIGS. 3-5.

However, if it is determined the turbine is degraded (YES at 308) the method advances to 309. At 309 the method includes indicating turbine degradation. In one example, the indication may be a flag in the control system. Next at 310 the method includes selecting a turbine degradation mitigation action. In one example, the turbine degradation mitigation action may be selected from a group of turbine degradation mitigation actions. Exemplary turbine degradation mitigation actions are shown in FIG. 6 and discussed in greater detail herein. Next at 312 the method includes implementing the selected turbine degradation mitigation action. In one example, the turbine degradation mitigation action may be implemented for a period of time. In such an example, the duration of the action may be determined based on a difference between the modeled and sensed pressure values. In this way, the severity of the degradation may dictate the duration of the mitigation action, if desired. However in other examples, the duration of the mitigation action may be predetermined.

After 312 the method returns to 302. In this way, turbine degradation mitigation actions may be implemented until it is determined that the turbine is not degraded. Thus, steps 302-312 may be repeated. Therefore, it will be appreciated that more than one turbine degradation mitigation action may be implemented. Consequently, different mitigation actions may be implemented to increase the likelihood of the turbine degradation being resolved. In one example, each mitigation action may be different from the previous action. Thus, it will be appreciated that a first and a second turbine degradation mitigation action may be implemented at non-overlapping time intervals in one example or at overlapping time intervals in another example. Specifically in one example, the first and second turbine degradation mitigation actions may be implemented at overlapping time intervals when it is determined that the first operating condition does not resolve turbine degradation. Additionally, the mitigations actions may be selected to alleviate the degradation condition without negatively impacting vehicle operation. For instance, if the engine is running at very high speed and load and it is desirable for the condition to be alleviated quickly, the turbine bypass valve may be adjusted to reduce the likelihood of further damage to the engine by over-pressurization. Further if an engine were running at lower load with lower pressures, a mitigation action may be implemented that has lesser impact on vehicle operation to mitigate the degradation, but decreases adverse effects of the mitigation action. Further in one example, when a predetermined number of turbine degradation mitigation actions have been implemented the method may end. The specific types of turbine degradation mitigation actions which may be used in the method are discussed in greater detail herein.

Figure 4:
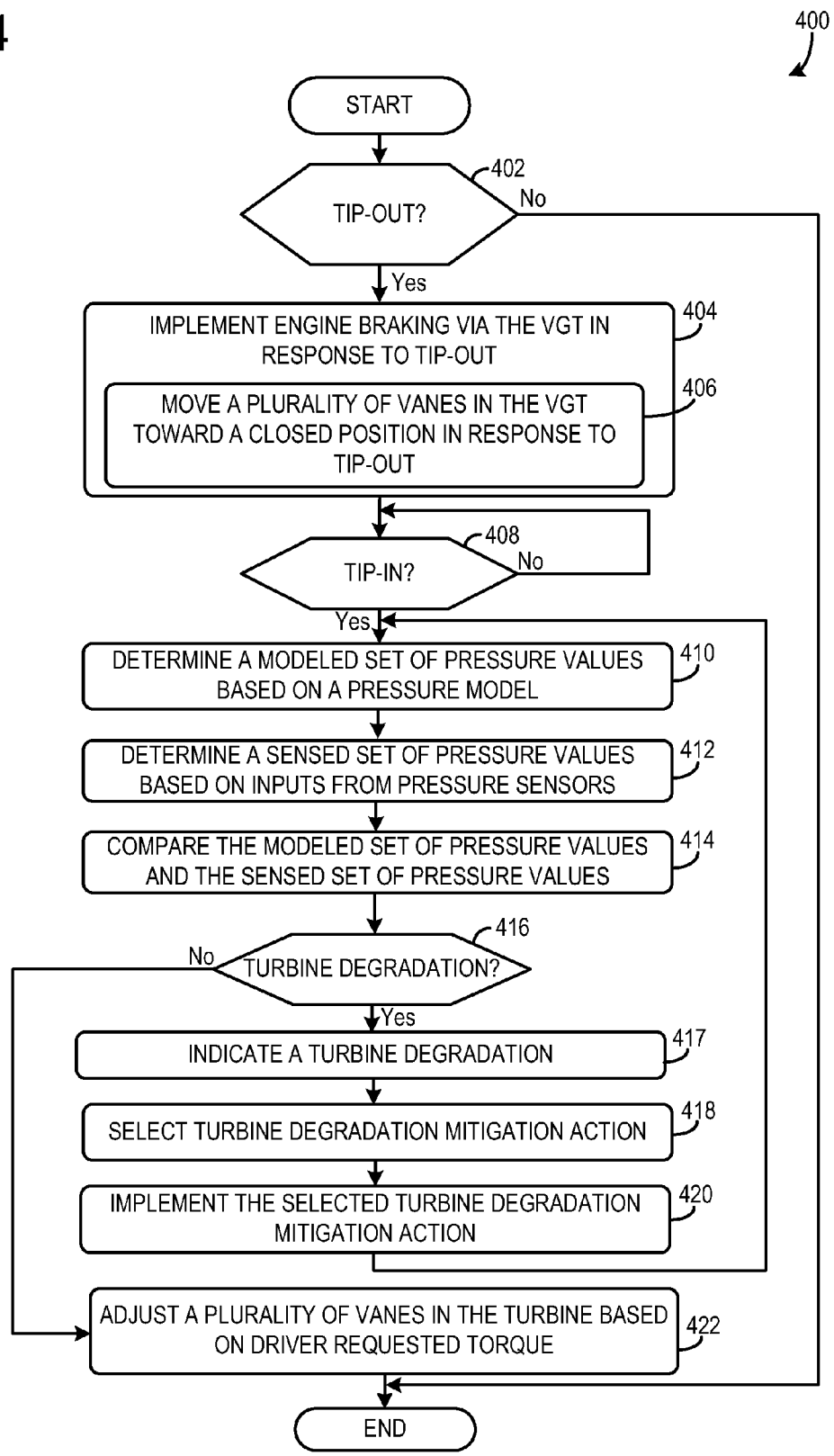

FIG. 4 shows a method 400 for operation of an engine system. The method 400 may be implemented via engine system 100, electronic control sub-system 170, etc., described above with regard to FIG. 1. However in other examples other suitable engine systems, electronic control sub-system, etc., may be used to implement method 400.

At 402 the method includes determining if a tip-out is being implemented. It will be appreciated that tip-out may include discontinuing throttle adjustment and/or decreasing fuel injection in the engine. It will be appreciated that a tip-out request may be sent to the engine system (e.g., the control system) when a driver has discontinued a torque request via an input device such as an acceleration pedal and/or closed loop vehicle speed control.

If tip-out is not being implemented (NO at 402) the method ends. However, in other cases the method may return to 402 if tip-out is not being implemented. If a tip-out is being implemented (YES at 402) the method advances to 404. At 404 the method includes implementing engine braking via the VGT in response to tip-out. Implementing engine braking via the VGT in response to tip-out may include at 406 moving a plurality of vanes in the VGT toward a closed position in response to tip-out. In this way, engine braking via the VGT may be implemented. Further in some examples, it may be determined if engine braking should be implemented prior to step 404. Various parameters may be taken into account when making this determination, such as engine temperatures, vehicle braking requests, vehicle speed, etc.

At 408 the method includes determining if tip-in is being implemented. In one example, tip-in may be initiated responsive to a driver torque request generated via an input device (e.g., acceleration pedal). If it is determined that tip-in is not being implemented (NO at 408) the method returns to 408. However, in other examples the method may end if tip-in is not being implemented. If tip-in is being implemented (YES at 408) the method advances to 410. Steps 410-422 are substantially identical to steps 302-314 shown in FIG. 3. Therefore, the description of steps 410-422 is omitted to avoid redundancy. Thus, various mitigation actions may be implemented after degradation is determined subsequent to tip-in, to improve turbocharger performance. It will be appreciated that the mitigation actions may be implemented after tip-in to decrease the likelihood of a false turbine degradation determination. Consequently, engine operation is improved.

Figure 5:
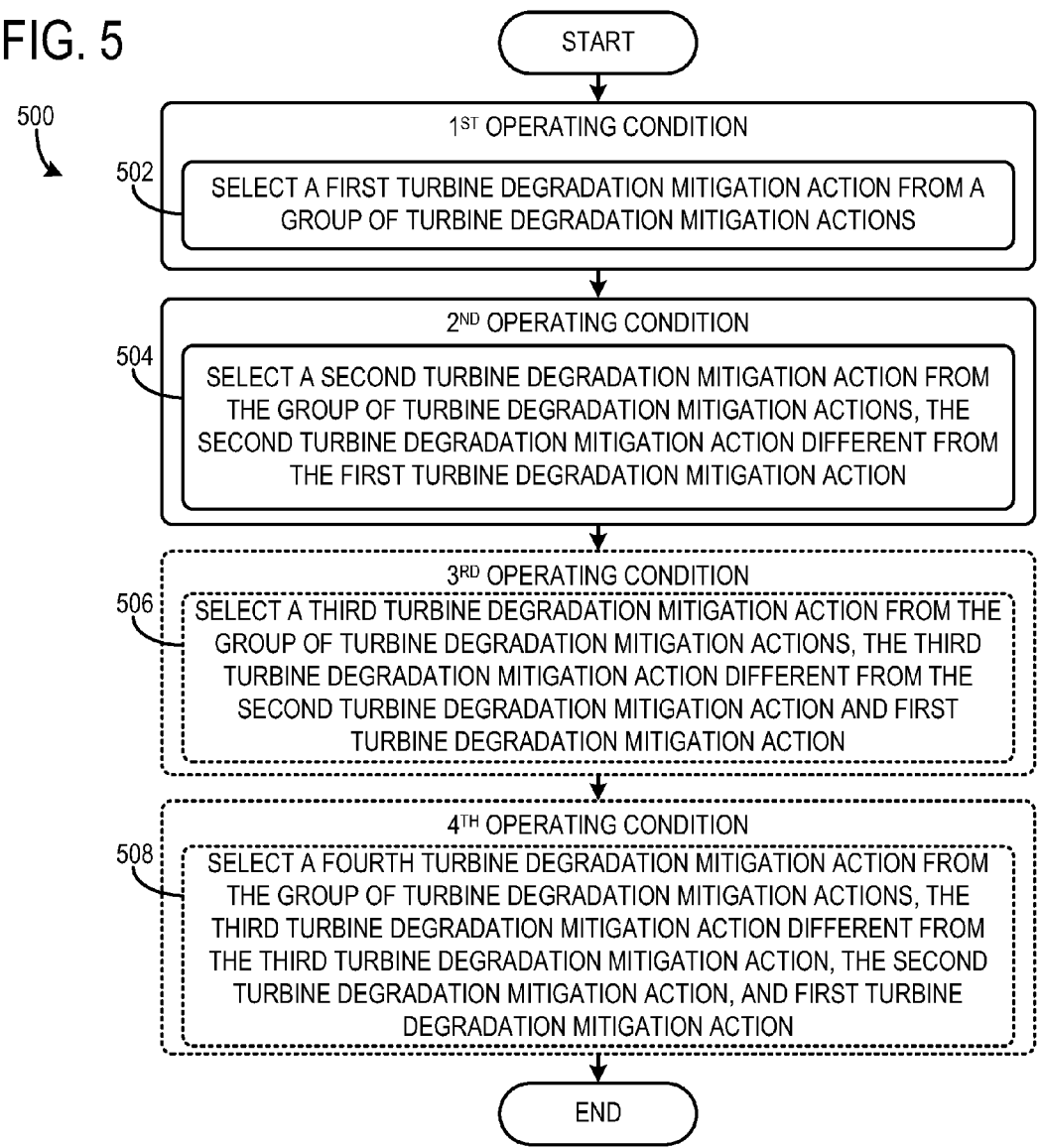

FIG. 5 shows a method 500 for operation of an engine system. The method 500 may be implemented via engine system 100, electronic control sub-system 170, etc., described above with regard to FIG. 1. However in other examples other suitable engine systems and electronic control sub-system may be used to implement method 500.

At 502 the method includes selecting a first turbine degradation mitigation action from a group of turbine degradation mitigation actions. As shown, step 502 is implemented during a first operating condition.

Next at 504 the method includes selecting a second turbine degradation mitigation action from the group of turbine degradation mitigation actions, the second turbine degradation mitigation action different from the first turbine degradation mitigation action. As shown, step 504 is implemented during a second operating condition. It will be appreciated that the second operating condition may be different from the first operating condition.

At 506 the method may include selecting a third turbine degradation mitigation action from the group of turbine degradation mitigation actions, the third turbine degradation mitigation action different from the second turbine degradation mitigation action and first turbine degradation mitigation action. As shown, step 506 is implemented during a third operating condition. It will be appreciated that the third operating condition may be different from the first operating condition and the second operating condition.

At 508 the method includes selecting a fourth turbine degradation mitigation action from the group of turbine degradation mitigation actions, the third turbine degradation mitigation action different from the third turbine degradation mitigation action, the second turbine degradation mitigation action, and first turbine degradation mitigation action. As shown, step 508 is implemented during a fourth operating condition. It will be appreciated that the fourth operating condition may be different from the third operating condition, the second operating condition, and the first operating condition. In this way, different mitigating actions may be implemented during different operating conditions, thereby enabling the mitigating action to be selected which best suit the current engine operating conditions, if desired. Thus, actions with a greater likelihood of decreasing overpressure conditions in the turbine may be selected, if desired. Selection of the actions may also take into account the action's impact on engine power output, emissions, etc. The mitigation actions may also be implemented based on the actions effectiveness for addressing the stuck conditions. For instance, a second mitigation action may be initiated while the first is still active and continuing with more actions until the stuck condition is removed. Further, this selection can be tailored to provide a desired response to alleviate the condition without excessive action that may negatively impact vehicle operation. An example would be if the engine is running at very high speed and load and the condition needs to be alleviated quickly, an effective action (e.g., the most effective action) would be activation of a turbine bypass valve to avoid further damage to the engine by over-pressurization. Further if an engine were running at lower load with lower pressures, the response could be using a mitigation action that has lesser impact on vehicle operation to resolve turbine degradation, but decreases (e.g., limits) any adverse effects of the mitigation action.

FIG. 6 shows a group of turbine degradation mitigation actions 600. It will be appreciated that the turbine degradation mitigation actions 600 may be implemented via the electronic control sub-system 170, shown in FIG. 1.

The actions may include adjustment of the turbine bypass valve at 602 and adjustment of the EGR valve at 604. Specifically, the turbine bypass valve and/or EGR valve may be opened to reduce pressure on the turbine. Specifically, in one example the valves may be opened from a closed position or opened to a greater extent from an open position. Adjusting the EGR valve and turbine bypass valve in this way may increase the likelihood of the turbine vanes becoming unstuck from a stuck position by relieving pressure build at an inlet of the turbine, thereby improving turbocharger operation. Additionally, the likelihood of damage to the turbine and engine caused by an over-pressure condition is decreased when the EGR valve and/or turbine bypass valve is operated in this way.

The actions 600 also include adjustment of fuel injection at 606 and adjustment of the throttle at 608. Adjustment of the aforementioned components in actions 606-608 may include limiting the opening amount to a threshold value or to predetermined range. For instance, fuel injection or throttle position may be limited to a threshold value. Further in one specific example, the fuel control may be filtered while increasing aerodynamic load on the turbine to reduce the likelihood of vane sticking Still further in another example, an acceleration input (e.g., pedal input) may be slewed to reduce the likelihood of vane sticking The actions may also include limiting turbine adjustment (e.g., turbine vane adjustment) at 610. Specifically in one example, the set-point of engine braking may be lowered to reduce the likelihood of vane sticking in the turbine. It will be appreciated that an adjustment of a component includes increasing (e.g., permitting) or decreasing (e.g., inhibiting) an amount of gas flow, fuel flow, etc., through a component. As discussed above with regard to FIGS. 3-5 one of the turbine degradation mitigation actions shown in FIG. 6 may be selected from the group of turbine degradation mitigation actions. It will be appreciated that in one example actions 602-610 may be sequentially implemented. However in other examples, alternate selection criteria may be used to determine which action(s) is/are implemented. In some examples, the magnitude and/or duration of the actions 602-610 may be a function of the difference between sensed pressure values and modeled pressure values. Thus, an opening amount of the turbine bypass valve may be proportional to a difference between a modeled change in pressure across the turbine and a sensed change in pressure across the turbine.

Further in one example, when multiple mitigation actions are implemented the degree of adjustment of one of the actions may be compensated for in another action. For instance, the degree of opening of the turbine bypass valve may be decreased when the EGR valve is opened or vice-versa. In yet another example, an amount of fuel injection reduction may be decreased when a throttle closing is increased or vice-versa.

Figure 7:
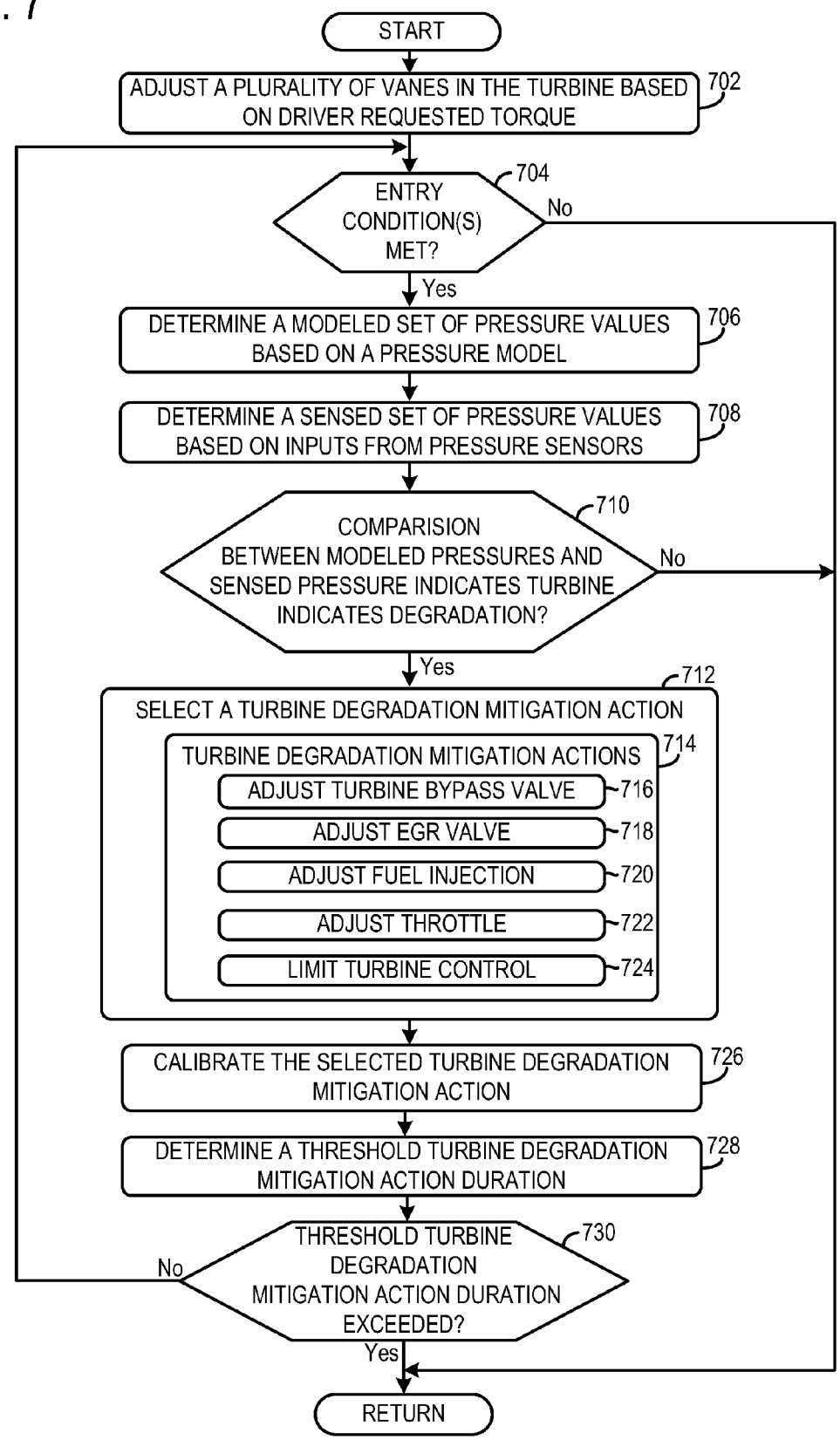
FIG. 7 shows another method for operation of an engine system.

FIG. 7 shows a method 700 for operation of an engine system. The method 700 may be implemented via engine system 100, electronic control sub-system 170, etc., described above with regard to FIG. 1. However in other examples other suitable engine systems and electronic control sub-system may be used to implement method 700.

At 702 the method includes adjusting a plurality of vanes in the turbine based on driver requested torque. It will be appreciated that this may be referred to as normal operation, in one example.

Next at 704 the method determines if entry condition(s) are met. The entry conditions may include one or more entry conditions. FIG. 8 shows a number of example entry conditions, discussed in greater detail herein. If it is determined that the entry conditions are not met (NO at 704) the method returns to the start. However, if it is determined that the entry conditions are met (YES at 704) the method advances to 706. At 706 the method includes determining a modeled set of pressure values based on a pressure model and at 708 the method includes determining a sensed set of pressure values based on inputs from pressure sensors.

Next at 710 the method determines if a comparison between modeled pressures and sensed pressure indicates turbine indicates degradation. If it is determined that the comparison does not indicate turbine degradation (NO at 710) the method returns to the start. However, if it is determined that the comparison indicates turbine degradation (YES at 710) the method advances to 712. At 712 the method includes selecting a turbine degradation mitigation action.

The turbine degradation mitigation actions are shown at 714. The actions include adjusting (e.g., openings) the turbine bypass valve at 716, adjusting (e.g., openings) the EGR valve at 718, adjusting fuel injection at 720, adjusting throttle at 722, and limiting turbine control at 724. As previously discussed the actions above may be iteratively implemented in a sequential order. Therefore, a first turbine degradation mitigation action may be implemented during a first time interval and a second turbine degradation mitigation action may be implemented at a second time interval. It will be appreciated that the time intervals may be non-overlapping, in one example, or overlapping, in another example.

At 726 the method includes calibrating the selected turbine degradation mitigation action. The calibration may include determining a magnitude of the degradation mitigation action. For instance, the degree of opening of the turbine bypass valve or EGR valve may be determined. The amount of opening or other mitigation action magnitude may be determined based on the comparison between the modeled and sensed pressures. For instance, the amount of opening may be proportional to the difference between the modeled and sensed pressures. Specifically, the degree of opening may be increased as the difference between the modeled and sensed pressures increases.

Next at 728 the method includes determining threshold turbine degradation mitigation action duration. The threshold duration may be determined based on the comparison between the modeled and sensed pressures. For instance, threshold duration may be proportional to the difference between the modeled and sensed pressures. For instance, the threshold duration may be increased as the difference between the modeled and sensed pressures increases.

At 730 the method includes determining if the threshold turbine degradation mitigation action duration has been exceeded. If it is determined that the threshold mitigation action duration has not been exceeded (NO at 730) the method returns to 704. However, if it is determined that the threshold mitigation action duration has been exceeded (YES at 730) the method returns to the start.

FIG. 8 shows a plurality of entry conditions 800. It will be appreciated that the entry conditions may be used in the method 700 described above. The entry conditions may include a condition where the turbine pressure is greater than a threshold value at 802, a condition where the turbine temperature is greater than a threshold value at 804, and/or a condition where an exhaust flow is greater than a threshold value 806. The entry conditions may additionally or alternatively include a condition where the oil temperature is greater than a low end threshold value at 808, a condition where the oil temperature is less than a high end threshold value at 810, a condition where an airflow (e.g., intake system airflow downstream of compressor) is greater than a threshold value, a condition where a turbine degradation mitigation strategy abort flag has been set, and/or a condition where engine braking is occurring. It will be appreciated that at least one of the entry conditions shown in FIG. 8 may be used as a condition in method 700. Further in some examples groups of two or more entry conditions may be used in method 700. Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific examples are not to be considered in a limiting sense, because numerous variations are possible. For example, the above technology can be applied to V-6, -I4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An engine system comprising:
a variable geometry turbocharger including a compressor positioned in an intake sub-system in fluidic communication with the engine and a turbine positioned in an exhaust sub-system in fluidic communication with the engine, the turbine including a plurality of adjustable vanes and a turbine inlet and a turbine outlet;
an electronic control sub-system including instructions stored in memory executable by a processor to:
in response to throttle tip-in, determine a sensed turbine inlet pressure and a sensed turbine outlet pressure based on signals received from sensors adjacent to the turbine inlet and the turbine outlet;
determine a modeled turbine inlet pressure and a modeled turbine outlet pressure based on a turbine inlet pressure model and turbine outlet pressure model; and
indicate variable geometry turbine degradation based on a comparison of the modeled and sensed turbine inlet pressures and turbine outlet pressures.

2. The engine system of claim 1, where the electronic control sub-system includes instructions stored in memory executable by a processor to, in response to the variable geometry turbine degradation, select a turbine degradation mitigation action from a group of turbine degradation mitigation actions based on the comparison of the modeled and sensed turbine inlet pressures and turbine outlet pressures.

3. The engine system of claim 2, where the group of turbine degradation mitigation actions includes adjustment of a turbine bypass valve in the engine system, adjustment of an exhaust gas recirculation (EGR) valve in the engine system, adjustment of a throttle in the engine system, and adjustment of fuel injection in the engine system.

4. A method for operating an engine system, comprising:
indicating a variable geometry turbine degradation based on a comparison of a modeled set of turbine pressure values and a sensed set of turbine pressure values, each set of turbine pressure values including a pressure value upstream of the turbine and a pressure value downstream of the turbine, the variable geometry turbine positioned downstream of an engine cylinder.

5. The method of claim 4, where a ratio of the upstream pressure value and the downstream pressure value in each of the sensed set of turbine pressure values and the modeled set of turbine pressure values are compared to determine the indicated variable geometry turbine degradation.

6. The method of claim 5, where the variable geometry turbine degradation is determined when a difference between the pressure ratios is outside a range that is greater than an error threshold of the modelled set of pressure values and the sensed set of turbine pressure values as well as an expected pressure range variability mapped for a condition the engine is operating in for a set time that exceeds normal response time ranges of the turbocharger.

7. The method of claim 4, where a change in pressure across the turbine in each of the sensed set of turbine pressure values and the modeled set of turbine pressure values are compared to determine variable geometry turbine degradation.

8. The method of claim 7, where the variable geometry turbine degradation is determined when a difference between the sensed change in pressure across the turbine and the modeled change in pressure across the turbine is greater than a pre-defined pressure difference threshold that is greater than an expected model accuracy and pressure variability for the engine population at an operation point.

9. The method of claim 4, where the modeled set of turbine pressure values are determined based on orifice flow using input parameters for exhaust mass flow, modeled or measure turbine vane position, and exhaust temperature.

10. The method of claim 4, further comprising, in response to determining the variable geometry turbine degradation, selecting a turbine degradation mitigation action from a group of turbine degradation mitigation actions based on the comparison of the modeled set of turbine pressure values and the sensed set of turbine pressure values.

11. The method of claim 4, where the turbine vane degradation includes slow or non-responsive vanes in the variable geometry turbine.

12. The method of claim 4, where the modeled set of turbine pressure values is a function of a modeled turbine vane position.

13. The method of claim 4, where determining the variable geometry turbine degradation is initiated in response to a throttle tip-in event.

14. A method for operating an engine system comprising:
during a first operating condition selecting a first turbine degradation mitigation action from a group of turbine degradation mitigation actions including adjustment of a turbine bypass valve, adjustment of an exhaust gas recirculation (EGR) valve, adjustment of a throttle, and adjustment of fuel injection; and
during a second operating condition selecting a second turbine degradation mitigation action from the group of turbine degradation mitigation actions, the second turbine degradation mitigation action different from the first turbine degradation mitigation action and the second operating condition different from the first operating condition.

15. The method of claim 14, where the first turbine degradation mitigation action and the second turbine degradation action are sequentially implemented.

16. The method of claim 14, where the first turbine degradation mitigation action and the second turbine degradation action are implemented at overlapping time intervals when it is determined that the first operating condition does not resolve turbine degradation.

17. The method of claim 14, where the first turbine degradation mitigation action and the second turbine degradation mitigation action are selected based on a comparison of a modeled set of turbine pressure values and a sensed set of turbine pressure values, each set of turbine pressure values including a pressure value upstream of the turbine and a pressure value downstream of the turbine.

18. The method of claim 14, further comprising during a third operating condition selecting a third turbine degradation mitigation action from the group of turbine degradation mitigation actions, the third turbine degradation mitigation action different from the second turbine degradation mitigation action and first turbine degradation mitigation action.

19. The method of claim 18, further comprising during a fourth operating condition selecting a fourth turbine degradation mitigation action from the group of turbine degradation mitigation actions, the third turbine degradation mitigation action different from the third turbine degradation mitigation action, the second turbine degradation mitigation action, and first turbine degradation mitigation action.

20. The method of claim 14, where adjustment of a throttle includes limiting throttle adjustment to a predetermined range and adjustment of fuel injection includes limiting fuel injection to a predetermined range.

* * * * *